United States Patent
Dec (10) Patent No.: US 8,203,943 B2
(45) Date of Patent: Jun. 19, 2012

(54) COLORED ACCESS CONTROL LISTS FOR MULTICAST FORWARDING USING LAYER 2 CONTROL PROTOCOL

(75) Inventor: Wojciech Dec, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 11/895,679

(22) Filed: Aug. 27, 2007

(65) Prior Publication Data

US 2009/0059935 A1 Mar. 5, 2009

(51) Int. Cl.
*H04L 12/28* (2006.01)
*H04L 12/56* (2006.01)
*H04L 1/00* (2006.01)
*H04L 12/26* (2006.01)

(52) U.S. Cl. .................... 370/230; 370/390; 370/401
(58) Field of Classification Search .................. None
See application file for complete search history.

(56) References Cited

U.S. PATENT DOCUMENTS

| | | |
|---|---|---|
| 5,818,842 A | 10/1998 | Burwell et al. |
| 5,848,227 A | 12/1998 | Sheu |
| 6,055,364 A | 4/2000 | Speakman et al. |
| 6,078,590 A | 6/2000 | Farinacci et al. |
| 6,188,694 B1 | 2/2001 | Fine et al. |
| 6,304,575 B1 | 10/2001 | Carroll et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |
| 6,785,232 B1 | 8/2004 | Kotser et al. |

(Continued)

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

*Primary Examiner* — Chirag Shah
*Assistant Examiner* — Suk Jin Kang
(74) *Attorney, Agent, or Firm* — Baker Botts L.L.P.

(57) ABSTRACT

In one embodiment, a method includes receiving, by an access node, multicast control parameters for white, black, and grey lists of multicast groups. The access node applies the multicast control parameters to an IGMP process running on a port associated with a subscriber. In response to receiving an IGMP message requesting joining a multicast group, the access node either: autonomously forwarding the multicast group on the port where the multicast group in on the white list, blocking the multicast group on the port where the multicast group in on the black list, or relying on a Layer 3 broadband network gateway (BNG) to instruct the access node whether to add a forwarding entry on the port for the multicast group where the multicast group in on the grey list. It is emphasized that this abstract is provided to comply with the rules requiring an abstract that will allow a searcher or other reader to quickly ascertain the subject matter of the technical disclosure.

20 Claims, 6 Drawing Sheets

U.S. PATENT DOCUMENTS

| | | | |
|---|---|---|---|
| 6,785,265 B2 | 8/2004 | White et al. | |
| 6,789,121 B2 | 9/2004 | Lamberton et al. | |
| 6,798,775 B1 | 9/2004 | Bordonaro | |
| 6,801,533 B1 | 10/2004 | Barkley | |
| 6,813,268 B1 | 11/2004 | Kalkunte et al. | |
| 6,826,698 B1 | 11/2004 | Minkin et al. | |
| 6,829,252 B1 | 12/2004 | Lewin et al. | |
| 6,839,348 B2 | 1/2005 | Tang et al. | |
| 6,850,521 B1 | 2/2005 | Kadambi et al. | |
| 6,850,542 B2 | 2/2005 | Tzeng | |
| 6,852,542 B2 | 2/2005 | Mandel et al. | |
| 6,892,309 B2 | 5/2005 | Richmond et al. | |
| 6,963,573 B1 * | 11/2005 | Cain et al. | 370/401 |
| 7,009,983 B2 | 3/2006 | Mancour | |
| 7,113,512 B1 | 9/2006 | Holmgren et al. | |
| 7,116,665 B2 | 10/2006 | Balay et al. | |
| 7,173,934 B2 | 2/2007 | Lapuh et al. | |
| 7,454,518 B1 * | 11/2008 | Cain et al. | 709/238 |
| 2002/0196795 A1 | 12/2002 | Higashiyama | |
| 2003/0110268 A1 | 6/2003 | Kermarec et al. | |
| 2003/0123453 A1 * | 7/2003 | Ooghe et al. | 370/395.53 |
| 2003/0142674 A1 | 7/2003 | Casey | |
| 2003/0165140 A1 * | 9/2003 | Tang et al. | 370/393 |
| 2003/0177221 A1 | 9/2003 | Ould-Brahim et al. | |
| 2004/0095940 A1 | 5/2004 | Yuan et al. | |
| 2004/0125809 A1 | 7/2004 | Jeng | |
| 2004/0158735 A1 | 8/2004 | Roese | |
| 2004/0165525 A1 | 8/2004 | Burak | |
| 2004/0165600 A1 | 8/2004 | Lee | |
| 2004/0264364 A1 | 12/2004 | Sato | |
| 2005/0007951 A1 | 1/2005 | Lapuh et al. | |
| 2005/0030975 A1 | 2/2005 | Wright et al. | |
| 2005/0063397 A1 | 3/2005 | Wu et al. | |
| 2005/0091313 A1 * | 4/2005 | Zhou et al. | 709/204 |
| 2005/0099949 A1 | 5/2005 | Mohan et al. | |
| 2005/0114656 A1 * | 5/2005 | Liu et al. | 713/163 |
| 2005/0163049 A1 | 7/2005 | Yazaki et al. | |
| 2006/0034281 A1 * | 2/2006 | Cain et al. | 370/390 |
| 2006/0146857 A1 * | 7/2006 | Naik et al. | 370/432 |
| 2006/0164984 A1 * | 7/2006 | Rao et al. | 370/230 |
| 2006/0182037 A1 | 8/2006 | Chen et al. | |
| 2006/0294297 A1 * | 12/2006 | Gupta | 711/108 |
| 2007/0253409 A1 * | 11/2007 | Fu et al. | 370/389 |
| 2008/0010666 A1 * | 1/2008 | Cheng et al. | 726/1 |
| 2008/0062999 A1 | 3/2008 | Platnic | 370/401 |
| 2008/0095183 A1 * | 4/2008 | Bijwaard et al. | 370/432 |
| 2009/0019469 A1 * | 1/2009 | Foti et al. | 725/27 |
| 2009/0125470 A1 * | 5/2009 | Shah et al. | 706/47 |
| 2009/0144807 A1 * | 6/2009 | Zheng | 726/3 |
| 2009/0180777 A1 * | 7/2009 | Bernard et al. | 398/68 |
| 2010/0223380 A1 * | 9/2010 | Zheng | 709/224 |
| 2011/0058550 A1 * | 3/2011 | Gu et al. | 370/390 |

* cited by examiner

COLORED ACCESS CONTROL LISTS FOR MULTICAST FORWARDING USING LAYER 2 CONTROL PROTOCOL

TECHNICAL FIELD

This disclosure relates generally to the field of data communications systems; more specifically, to subscriber access and communications over a high-speed network.

BACKGROUND

Digital Subscriber Line (DSL) technology is widely-used today for increasing the bandwidth of digital data transmissions over the existing telephone network infrastructure. In a typical system configuration, a number of DSL subscribers are connected to a service provider (SP) network through a Digital Subscriber Line Access Multiplexer (DSLAM), which concentrates and multiplexes signals at the telephone service provider location to the broader wide area network. DSL network operators are increasingly deploying DSLAMs that act as Layer 2 (L2) Ethernet access nodes.

One of the functions attributed to these devices is that of being able to perform IP multicast traffic replication at L2 using standard Internet Group Management Protocol (IGMP) snooping behavior. (IGMP is a well known Internet protocol that provides a way for a computer to report its multicast group membership to adjacent routers. IGMP snooping is an attribute of Ethernet L2 devices that perform multicast replication control. Multicasting is a technique that allows one computer on the Internet to send content to multiple other computers that have identified themselves as interested in receiving the originating computer's content.) Essentially, the DSLAM snoops (i.e., captures and analyzes) IGMP messages sourced by directly attached subscribers and creates or removes multicast L2 forwarding entries accordingly. Network operators use multicast traffic replication at the DSLAM access node to optimize the use of bandwidth resources in the aggregation network while still delivering multicast services to multiple subscribers attached directly to the access node.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the disclosure herein. However, persons having ordinary skill in the relevant arts will appreciate that these specific details may not be needed to practice the embodiments described.

In the context of the present application, a communications network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

In one embodiment, a L2 multicast control mechanism is provided in which a L2 access node is configured by a L3 BNG node with a so-called "grey" list of multicast group addresses for which the L2 node is allowed to forward multicast traffic only when explicitly instructed by the L3 node (i.e., through an explicit instruction from the L3 node to the L2 node allowing forwarding). That is, the grey-list tells the L2 node not to make an autonomous decision, but rather pass the signaling to the L3 node and do no autonomous decision-making unless explicitly instructed to do so. The L2 node is also configured by the L3 node with a "white" list of multicast groups for which the L2 node is allowed to perform standard IGMP snooping and autonomously allow multicast groups to be forwarded onto the subscriber port, and also a "black" list of multicast groups that should be blocked on the port. In one implementation, the multicast control mechanism is compatible with the architectural/topological model of an Ethernet-based aggregation network described in the DSL forum Technical Report TR-101.

In a specific embodiment, a method is provided wherein after a subscriber establishes a session towards the BNG through an access node, the BNG device retrieves the subscriber's service profile with the colored (white/grey/black) access control lists from a Radius/Policy server. The BNG then communicates the access control list parameters to the access node. When a subscriber device on port X sends toward the access node an IGMP message requesting joining a group found in the white list, the access-node takes an autonomous multicast decision and commences forwarding the group on port X.

On the other hand, when the subscriber device on port X sends toward the access node an IGMP message requesting joining a group found in the grey list, the access node takes no autonomous multicast decision; rather, it forwards the signaling to the BNG (using either IGMP or L2CP) which then correlates the join message to the multicast policy for the subscriber on port X. The BNG evaluates the multicast control policy and determines whether the particular group is to be allowed onto the port; if so, then the BNG instructs the access node via L2 Control Protocol (L2CP) that the multicast group is to be forwarded. In another embodiment, the BNG may also determine whether sufficient resources are available for the particular group is to be allowed onto the port.

In the event that the subscriber sends toward the access node an IMGP message requesting joining a multicast group from the black list, the access node determines that the multicast group is blocked via the blacklist applied on port acts and discards the IGMP message.

Figure 1:
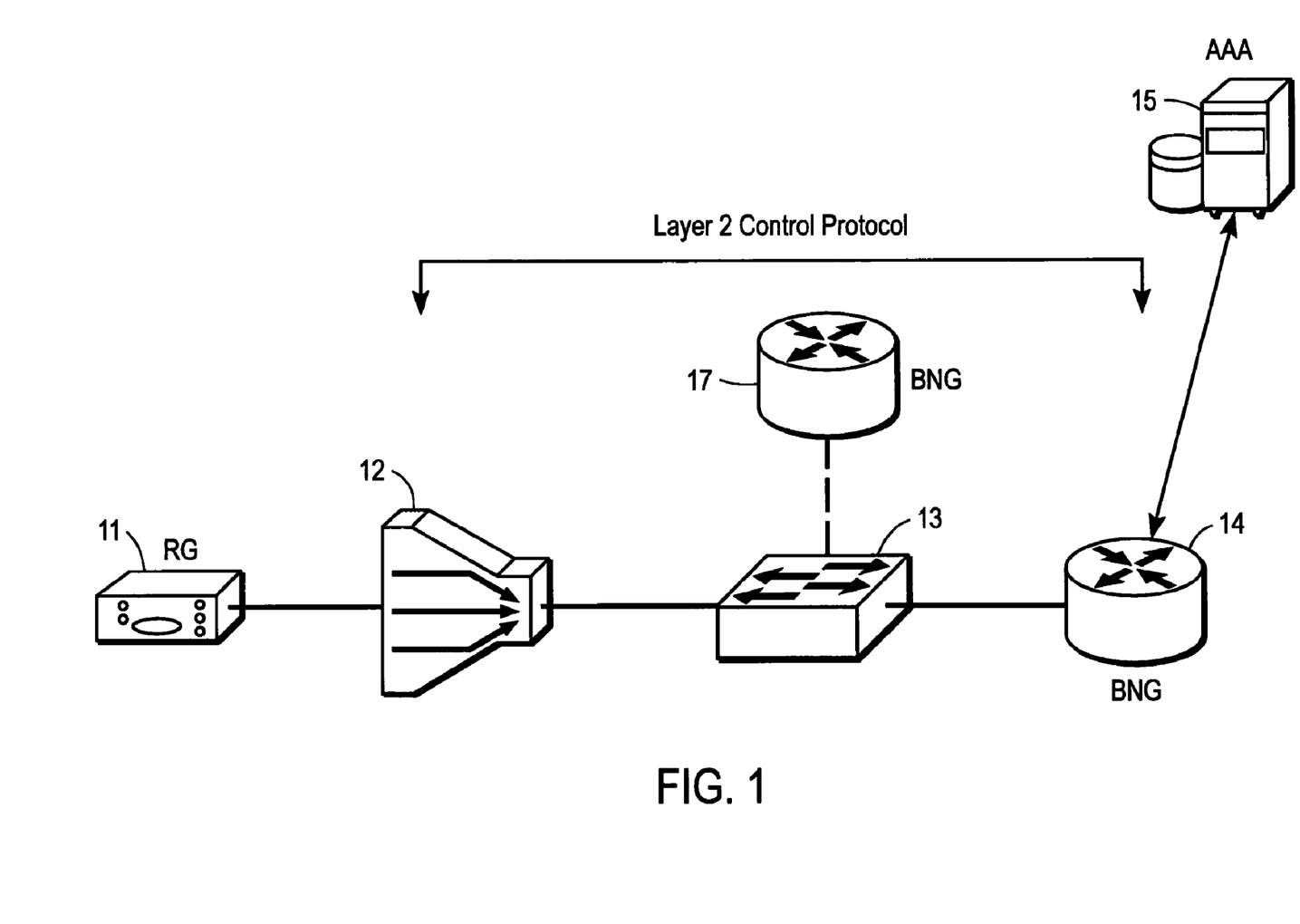
FIG. 1 illustrates an example communication network with a multicast transport service and access control mechanism.

Referring now to FIG. 1, an example communication network with a multicast transport service and access control mechanism is shown comprising a residential gateway (RG) device 11 connected with an access node 12. Access node 12 may comprise any node that contains at least one standard Ethernet interface that serves as its "northbound" interface into which it aggregates traffic from several user ports or Ethernet-based "southbound" interfaces, e.g., any L2 Ethernet switch. As used in the present disclosure, a residential gateway (RG) is any network interface device that provides a way to access a service delivered to the home, such as telephony, cable TV, and Internet service. RG 11 may comprise devices such as set-top boxes, personal computers (PCs) and modems, as well as other types of intelligent network-interface devices that have yet to be developed. In this example, RG 11 is a subscriber device able to perform standard IGMPv3 or IGMPv4 functions (e.g., issuing IGMP requests, snooping, proxy, etc.) as well as receiving multicast traffic.

In the example of FIG. 1, access node 12 comprises a L2 DSLAM with IGMP snooping functionality. Access node 12's southbound interface towards the subscriber, port X, may be preconfigured with a default multicast IP or Media Access Control (MAC) address access control list (ACL) (blacklist) restricting access across all VLANs on the given port X. Access node 12 is shown connected with an L3 routing device 14 (e.g., a BNG) via an Ethernet switch 13. BNG 14 acts as the L2CP controller and terminates the subscriber session (PPP or IP). BNG 14 is a L3 device responsible for handling subscriber sessions and all the AAA interaction and QoS according to a preconfigured policy. In the context of the present application, BNG 14 comprises any L3 router or broadband network gateway device that provides aggregation capabilities (e.g. IP, PPP, Ethernet) between the access network and the SP network. BNG 14 may encompass a BRAS and also be an injection point for policy management and IP QoS in the access network. Note that in the example of FIG. 1 L2CP adjacency is established between access node 12 and BNG 14.

BNG 14 is also shown connected with an authentication, authorization, and accounting (AAA)/Policy server 15, containing the subscriber's service profile. AAA server 15 is configured with a subscriber profile containing a list of permitted or denied multicast group entries. For instance, the subscriber may be allowed to join as a receiver of multicast group 225.1.1.1 (white-list), requested to authorize to join group 225.2.2.2 (gray-list), and denied to join group 225.3.3.3 (black-list). L2CP adjacency is established between BNG 14 and access node 12. That is, a bidirectional IP communication interface between the L2C controller function in the BNG and the L2C reporting/enforcement function in the access node is established in accordance with the L2CP. (It is appreciated that the foregoing multicast group numbers represent just one example; many other group numberings or assignments are possible.)

It should be understood that in the example embodiment of FIG. 1, each conceptual list (i.e., white, gray or black) contains multicast source and group addresses, possibly with wildcards. A list's "color", flag, or code dictates the behavior of the access node with respect to subscriber source multicast signaling (based on the access node's semantical understanding of the conceptual list). Lists are provisioned via L2CP, but lists can also be provisioned manually or through alternative mechanisms. The "white" list consists of a list of channels through which the operator allows the subscriber to access without the need for any further policy decision-making (e.g., by an L3 node). For white-listed channels, the access node performs its standard IGMP snooping behavior and autonomously acts on subscriber's IGMP join/leave signaling. The "black" list consists of a list of channels which the operator does not allow the subscriber to access. In other words, the blacklist contains those channels that are restricted from access by the subscriber.

The "gray" list consists of a list of channels for which the operator requires more elaborate policy decision-making before granting access (e.g., AAA, prepaid service, etc.). For gray listed channels, the access node is not to make any autonomous decision regarding customer sourced join requests for groups on this list (unless forwarding state has already been established). The access node is allowed to forward multicast traffic onto the specified subscriber port only when explicitly instructed to do so by the BNG via the L2 control mechanism. The access node is expected to forward initial IGMP join requests downstream without summarization or signal such join requests in L2CP messaging sent towards the BNG. However, successive joins from the same port may be summarized. The access node is allowed to make an autonomous decision regarding customer sourced IGMP leave requests for groups on the grey list. Following the autonomous leave decision the access node may also signal (via L2CP to the BNG) the occurrence of the leave event along with statistics so as to facilitate subscriber accounting at the BNG.

Summarizing, a subscriber is allowed to join as a receiver of a multicast group 225.1.1.1 (white-list), requested to authorize to join group 225.2.2.2 (grey-list), and denied to join group 225.3.3.3 (black-list).

The example of FIG. 1 also shows a second, optional BNG 17 connected with Ethernet switch 13. BNG 17 may be optionally included in certain embodiments to provide L2CP functional controller partitioning, for instance, where BNG 14 provides multicast replication and forwarding control, while BNG 17 controls QoS considerations. In a dual BNG scenario additional functionality such as IGMP Echo and/or policies server coordination may be incorporated or configured into the appropriate network nodes.

Although the example of FIG. 1 describes the use of IGMP, which is a multicast control protocol for Internet Protocol version 4 (IPv4), it is appreciated that the inventive concepts disclosed above apply equally to other multicast control mechanisms and protocols, including Multicast Listener Discovery (MLD), which is commonly utilized for Internet Protocol version 6 (IPv6).

Figure 2A:
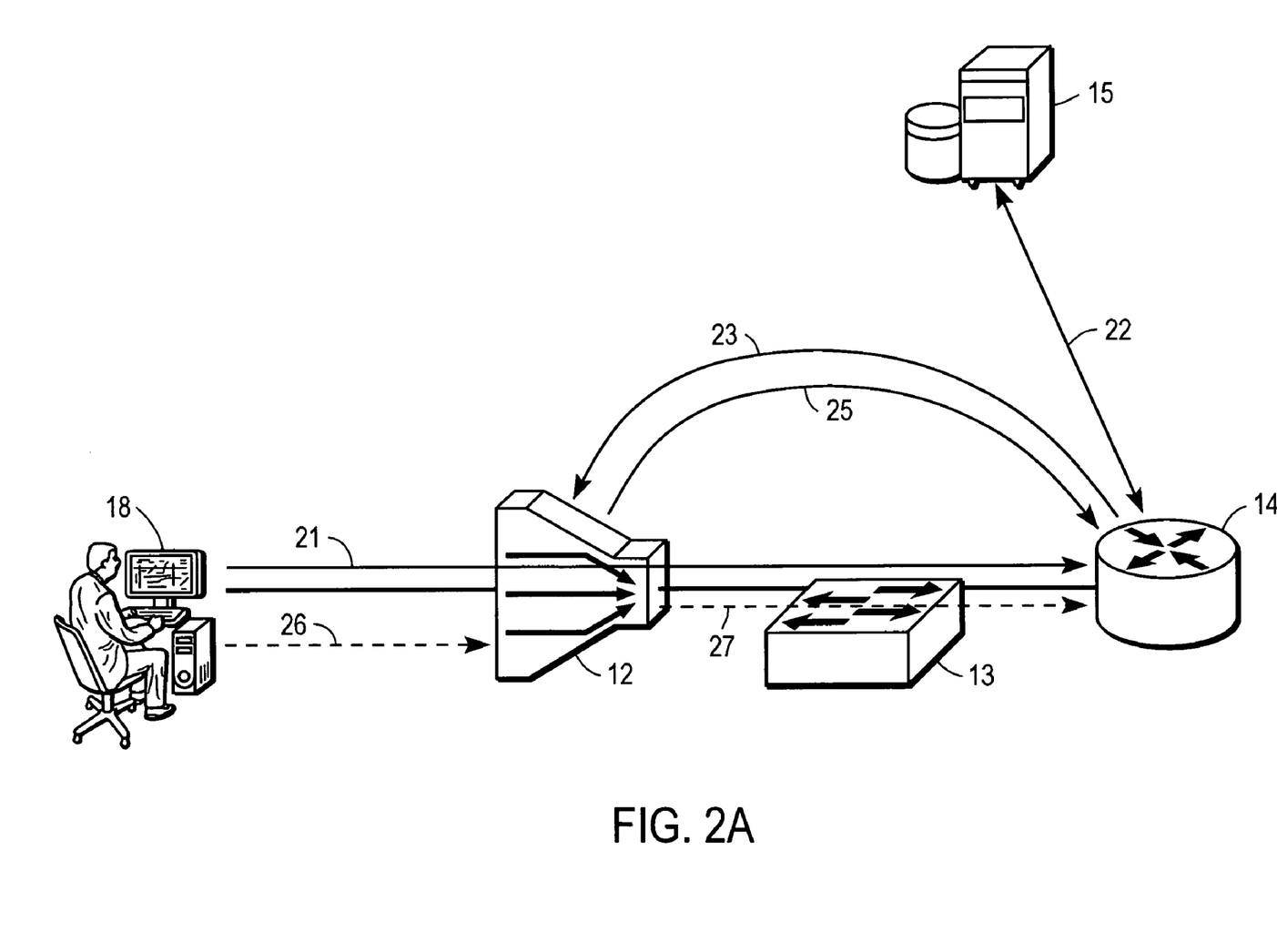
FIGS. 2A-2C illustrate an example multicast use-case for the network of FIG. 1.
Figure 2B:
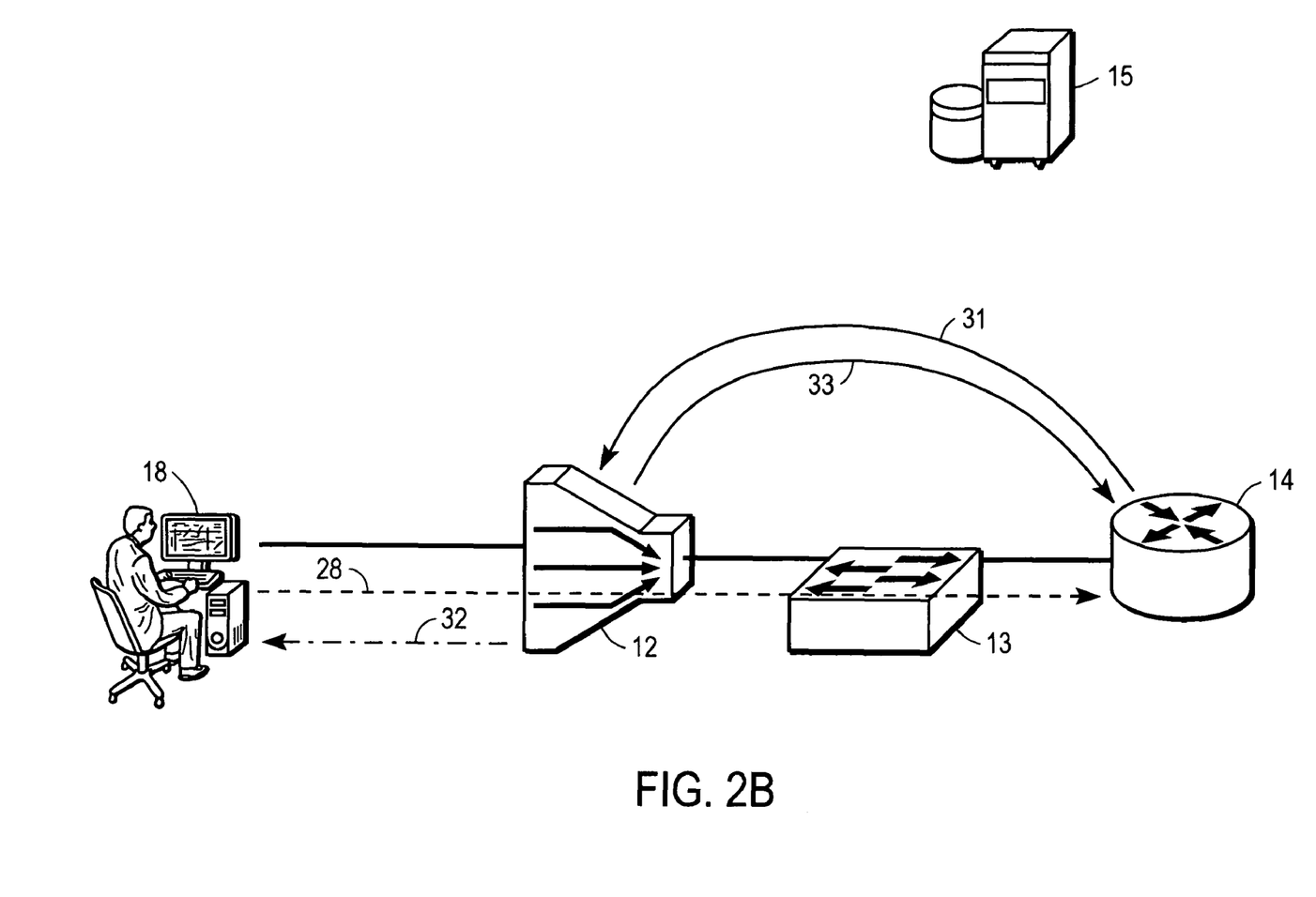
Figure 2C:
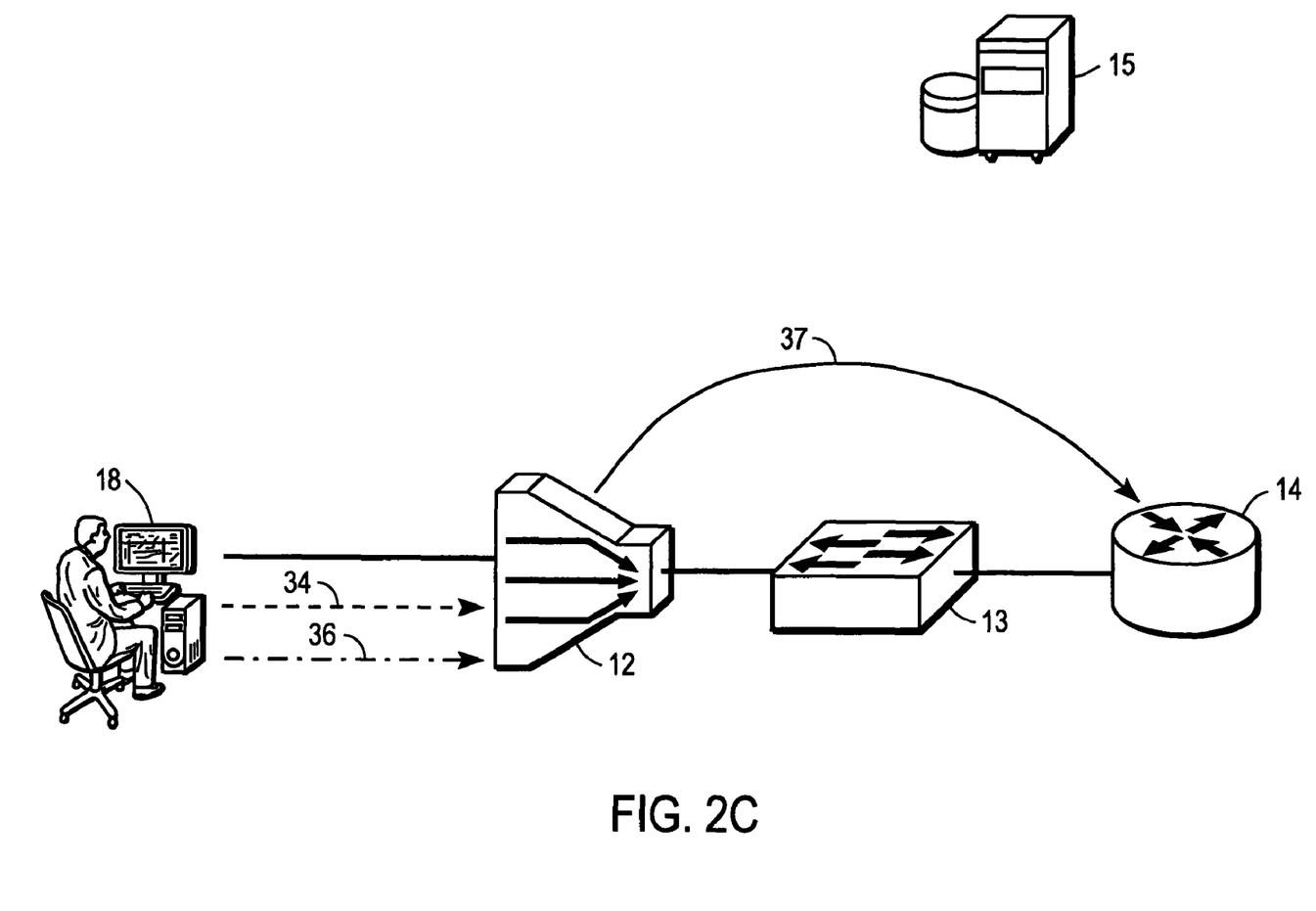

FIGS. 2A-2C illustrate an example multicast use-case for the network of FIG. 1. In this example, multicast forwarding between the access node and the BNG follows standard Ethernet (IEEE) and IGMP (IETF) behavior. (Note, however, that in an N:1 VLAN and IGMP signaling model, intermediate L2 switches may need to have IGMP reports suppression turned off.) Beginning with FIG. 2A, a residential gateway (RG) device 18 (e.g., a PC) is shown associated with a subscriber or user. The subscriber on port X first establishes a point-to-point (PPP) or IP session via RG 18 towards BNG 14, as shown by arrow 21. This session triggers an AAA mechanism that—based on the subscriber's credentials—results in the subscriber profile being passed from AAA server 15 to BNG 14. The subscriber profile contains the list of multicast control parameters, such as multicast group entries which are to be permitted or denied for the subscriber, and the associated policy actions, e.g., permit (225.1.1.1), authorize (225.2.2.2), and deny (225.3.3.3). This step is represented by arrow 22.

Next, BNG 14 communicates via L2CP the multicast white-list (225.1.1.1), grey-list (225.2.2.2) and black list (225.3.3.3) parameters to be used on the access node subscriber port X (arrow 23). In response, access node 12 enforces the L2CP multicast parameters onto the IGMP process on port X, replacing any default parameters. The activation of these parameters implicitly overrides or deactivates any IGMP messaging restriction (e.g., multicast or IGMP disabled) that was originally placed on port X. Access-node 12 then responds to BNG 14, confirming the application of the L2CP multicast control parameters, as shown by arrow 25.

After access node 12 has confirmed application of the multicast control parameters, subscriber RG 18 may send towards the access-node an IGMP message requesting joining group 225.1.1.1. This is represented in FIG. 2A by arrow 26. Access node 12 receives the IGMP join message on port X and processes the message which results in group 225.1.1.1 being found on the white-list. The access-node commences forwarding group 225.1.1.1 on port X and propagates the IGMP message on its downstream path (arrow 27). The net result of this process is that subscriber RG 18 on port X receives multicast group 225.1.1.1 traffic. In other words, the L2 access node may make autonomous group join and leave decisions for the white-list group members, which reduces the control load on the L3 BNG node. Optionally, BNG 14 may receive the IGMP join message and correlate it to the IGMP policy for the subscriber on port X, which in this case would result in a determination that no further action is required for the subscriber for group 225.1.1.1.

FIG. 2B continues the example use-case where subscriber RG 18 now sends towards access node 12 an IGMP message requesting joining multicast group 225.2.2.2 (arrow 28). Access node 12 receives the IGMP join message on port X and processes the message which results in group 225.2.2.2 being found on the grey-list. At this point, the access node does not commence forwarding group 225.2.2.2 on port X and propagates the IGMP message on its downstream path. Instead, BNG 14 receives the IGMP join message and correlates it to the multicast policy for subscriber on port X. This correlation may be based on previously learned MAC or IP addresses in combination with a DHCP Option82 messages.

In this example, BNG 14 evaluates the multicast control policy and determines that group 225.2.2.2 (grey-list) is to be allowed onto port X. Note that in other cases BNG 14 may deny the subscriber access to the multicast group based on the current multicast control policy. Thus, for group grey-list members the L2 node is not allowed to make autonomous group join decisions; instead, the L2 node defers to the L3 node, which makes the determination whether to allow or deny access based on authorization or policy information retrieved from server 15.

After making its determination whether forwarding should be permitted or not, BNG 14 instructs access node 12 via L2CP that the multicast group 225.2.2.2 is to be forwarded to Port X. This step is shown by arrow 31. Access node 12 receives the instruction (in this example allowing the multicast group onto port X) and creates a forwarding entry for group 225.2.2.2 on Port X (arrow 32). Afterward, access node 12 responds to BNG 14 confirming the application of the L2CP multicast group forwarding onto Port X. This last step is shown by arrow 33. The subscriber RG on port X may now receive multicast group 225.2.2.2 traffic.

Referring now of FIG. 2C, arrow 34 illustrates a further example use case wherein subscriber RG 18 sends towards access node an IGMP message requesting joining multicast group 225.3.3.3 (black-list). Access node 12 receives the IGMP join message on port X and processes the IGMP message. In this case, access node 12 determines that multicast group 225.3.3.3 is blocked via the black list applied on port X and discards the IGMP message.

The subscriber RG now sends towards the access node an IGMP message requesting leaving multicast group 225.2.2.2 (arrow 36). Access node 12 receives the IGMP leave message on port X and processes the message which results in group 225.2.2.2 being removed from being forwarded on Port X. This causes subscriber RG 18 to stop receiving multicast group 225.2.2.2 traffic. Access node 12 propagates the IGMP message on its downstream path and also optionally informs (via L2CP) the BNG about the leave event, passing any statistics collected. This step is shown by arrow 37.

Once BNG 14 receives the IGMP leave message and subscriber RG 18 terminates the PPP or IP session, BNG 14 may instruct access node 12 via L2CP to remove the L2CP communicated multicast restrictions and any multicast groups forwarding entries via L2CP, and revert to the default configuration on port X. In response, access node 14 may remove the L2CP multicast control elements from port X and reverts to the default multicast ACL or IGMP restriction configuration. Lastly, the access node responds to the BNG confirming the removal of the L2CP multicast control parameters.

Figure 3:
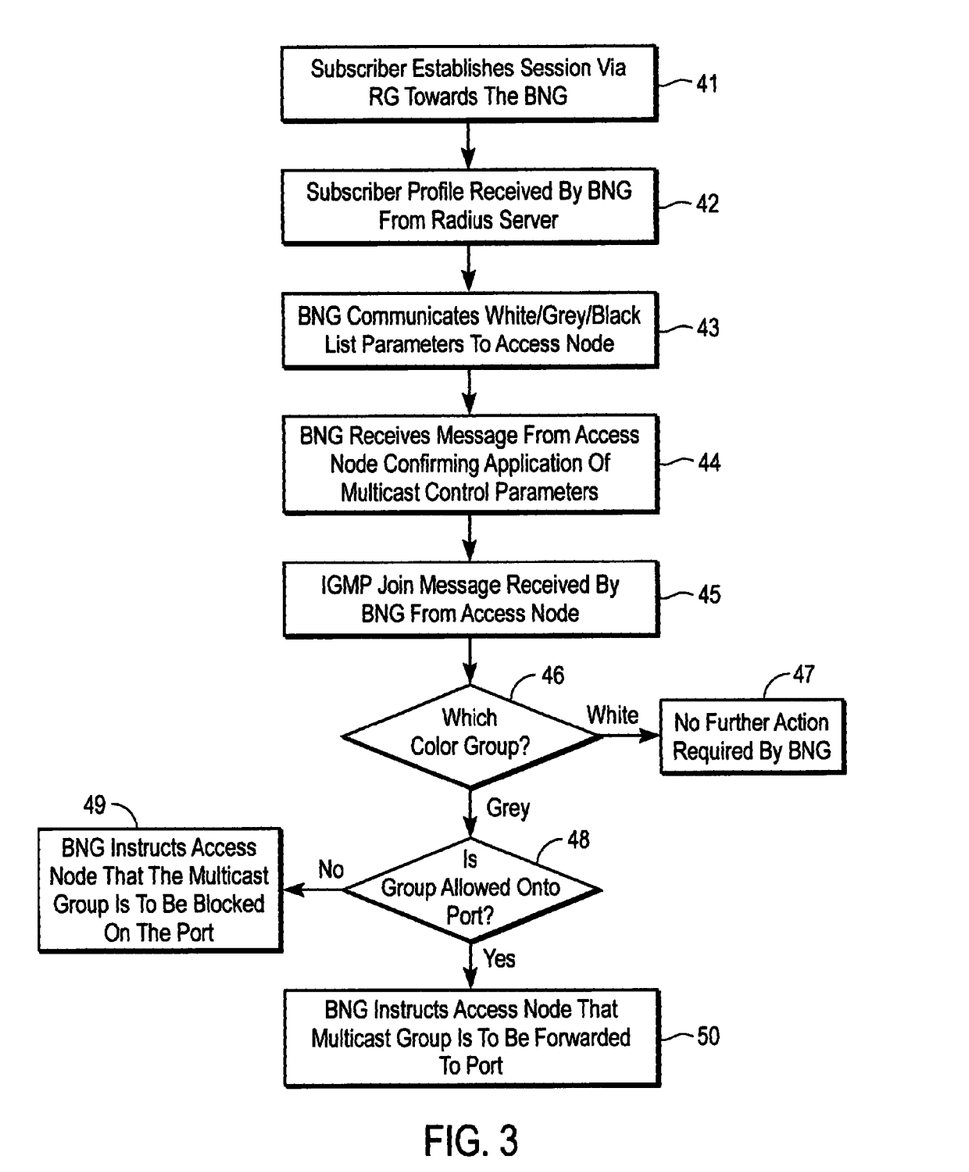
FIG. 3 illustrates an example method of operation for the network of FIG. 1.

FIG. 3 illustrates an example method of operation for the network of FIG. 1. The process starts with the subscriber establishing a session via a residential gateway towards the BNG (block 41). This triggers the BNG to communicate with the Radius (AAA) server in order to retrieve the subscriber profile based on the subscriber's credentials or port-id. The subscriber profile is then passed from the Radius server to the BNG (block 42). As explained previously, the subscriber profile contains the list of multicast control parameters, such as multicast group entries which are to be permitted or denied for the subscriber and the associated policy actions (e.g., permit. authorize or deny). After receiving the control parameters from the AAA server the BNG communicates the parameters to the access node via L2CP (block 43). In response, the BNG receives back a receipt confirmation message from the access node (block 44). The access node then enforces the L2CP multicast parameters onto the IGMP process on the port associated with the subscriber.

Continuing with the example of FIG. 3, at block 45 an IGMP join message is received by the BNG (sent by the access node, or via L2CP) which then correlates it to the policy for the subscriber on the associated port. Specifically, the BNG queries, the color (i.e., white, black, or grey) of the multicast group that the subscriber is requesting to join (block 46). If the group is found on the white list then no further action is required by the BNG (block 47). On the other hand, if the group is found on the grey list, the BNG evaluates the control policy for the subscriber and determines whether that group is allowed onto the subscriber's port (block 48). If the multicast group is allowed onto the subscriber's port, the BNG instructs the access node that the multicast group is to be forwarded to that port. This is shown occurring at block 50. Conversely, if the policy information indicates that a subscriber is not permitted to join the specified multicast group, then the BNG instructs the access node that the multicast group is to be blocked on the subscriber port (block 49).

Figure 4:
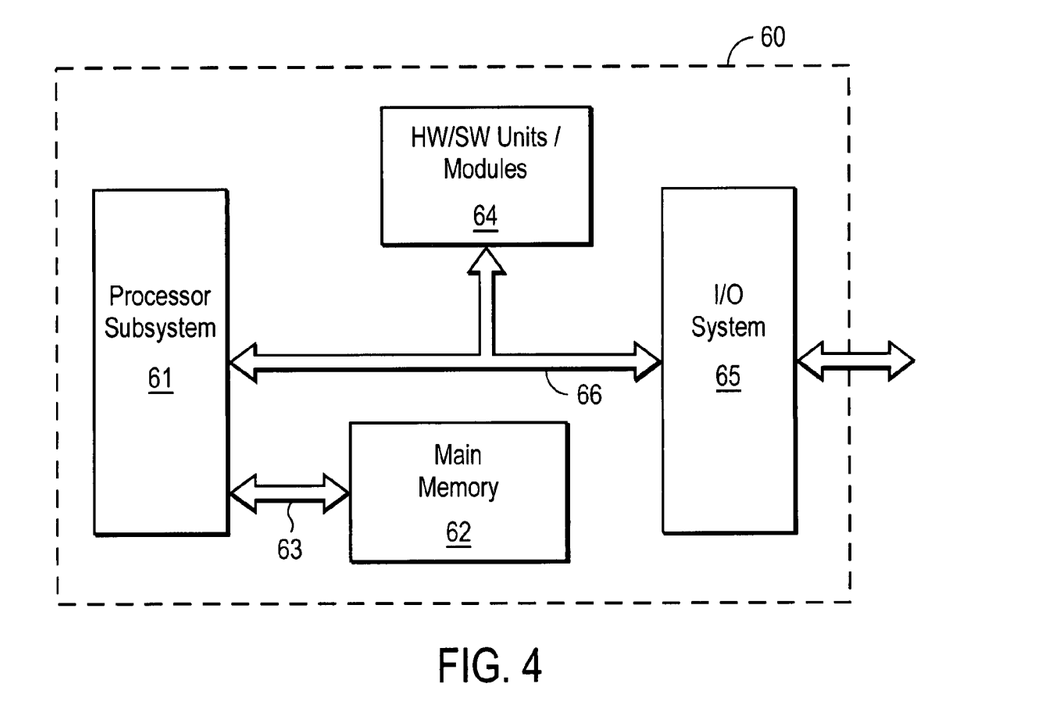
FIG. 4 illustrates an example network device or node.

FIG. 4 is a generalized block diagram showing an example network device or node 60, such as may comprise any of the nodes (e.g., a PC or server), devices, or gateways shown or described above. Node 60 includes a processor subsystem 61 coupled with a memory unit 62, one or more hardware/software modules 64, and an input/output (I/O) interface 65 via a system bus 66. Modules 64 may include software, firmware, or logic embedded in hardware for implementing any of the functions described herein, e.g., those functions associated with the sending/receiving of messages, running L2CP, retrieving subscriber policy information, etc.

It is appreciated that any router or network gateway device incorporated within, or utilized by or in conjunction with, node 60 may comprise separate hardware devices coupled to the system bus 66, or, alternatively, implemented as software programs or modules 64 that run on one or more processors of subsystem 61. In other words, the functions described above, as well as other associated functions, may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. For instance, while the preceding examples contemplate a single node or BNG responsible for determining subscriber requests and handling QoS matters, the concepts discussed above are applicable to other systems and network models that utilize distributed or partitioned BNG functionality. In addition, although DSL and an Ethernet DSLAM are described as an example access device, it should be understood that the inventive concepts disclosed herein apply to all forms of Ethernet access where multicast is used. Accordingly, the specification and drawings are to be regarded in an illustrative rather than a restrictive sense.

We claim:

1. A method comprising:
receiving, by a broadband network gateway, profile information from a server based on credentials of a subscriber, the profile information being associated with the subscriber, the subscriber connected to an access node via a residential gateway (RG) that has established a point-to-point protocol (PPP) or Internet protocol (IP) session with the access node, the profile information containing white-list, black-list and grey-list multicast control parameters;
communicating the white-list, black-list, and grey-list multicast control parameters to the access node;
receiving a confirmation message from the application of the multicast control parameters, which causes the access node to forward to the subscriber a first multicast group on the white-list responsive to a first message from the RG requesting joining of the first multicast group, block from the subscriber a second multicast group on the black-list responsive to a second message from the RG requesting joining of the second multicast group, and propagate a third message on a downstream path to the broadband network gateway, without autonomously creating a multicast forwarding entry, responsive to receiving the third message from the RG requesting joining of a third multicast group on the grey-list;
receiving, by the broadband network gateway, the third message on the downstream path; and
determining, by the broadband network gateway, that the third multicast group on the grey-list is to be forwarded to the subscriber based on a correlation of the third message to a current multicast policy for the subscriber, and only in response to the determination, communicating an instruction message to the access node allowing the access node to forward the third multicast group to the subscriber.

2. The method of claim 1 wherein the server comprises an authentication, authorization, and accounting (AAA) server.

3. The method of claim 1 further comprising, prior to the receiving of the profile information, passing credentials of the subscriber to the server.

4. The method of claim 1 wherein the communicating of the multicast control parameters to the access node is performed via a Layer 2 Control Protocol (L2CP) running between the BNG and the access node.

5. The method of claim 1 wherein the access node applies the multicast control parameters across all-Virtual Local Area Networks (VLANs).

6. An apparatus comprising:
one or more processors; and
a memory comprising one or more instructions executable at the processors, the one or more processors being operable, when executing the instructions, to:
receive multicast traffic and Internet Group Management Protocol (IGMP) requests from a residential gateway (RG);
receive white-list, black-list, and grey-list multicast control parameters from a Layer 3 (L3) node that retrieves, based on credentials of a subscriber, a profile of the subscriber that contains the white-list, black-list, and grey-list multicast control parameters from a server responsive to the subscriber establishing a session with the L3 node via the RG; and
apply the white-list, black-list, and grey-list multicast control parameters to the subscriber such that a first multicast group on the white-list multicast control parameters is forwarded to the subscriber responsive to a first IGMP message from the RG requesting joining of the first multicast group, a second multicast group on the black-list is blocked from the subscriber responsive to a second IGMP message from the RG requesting joining of the second multicast group and a third IGMP message is propagated on a downstream path, without autonomously creating a multicast forwarding entry, responsive to receiving the third IGMP message from the RG requesting joining of a third multicast group on the grey-list, the L3 node being operable to receive the third IGMP message on the downstream path and to correlate the third IGMP message to a current multicast policy for the subscriber and then determine whether the third multicast group on the grey list is to be forwarded to the subscriber, and only in response to the determination, communicating an instruction message to the access node allowing the access node to forward the third multicast group to the subscriber.

7. The apparatus of claim 6 wherein the L3 node comprises a broadband network gateway (BNG) device.

8. The apparatus of claim 7 wherein the one or more processors being further operable, when executing the instructions, to create a forwarding entry for the third multicast group in response to receiving the instructions from the BNG, and also to send a message to the BNG confirming the forwarding entry.

9. The apparatus of claim 7 wherein the one or more processors is further operable, when executing the instructions, to replace a pre-configured default media access control (MAC) or IP multicast list with the multicast control parameters received from the BNG.

10. The apparatus of claim 6 wherein the apparatus comprises a Digital Subscriber Line Access Multiplexer (DSLAM}.

11. The apparatus of claim 10 wherein the DSLAM is connected with the BNG across an Ethernet access network.

12. The apparatus of claim 6 wherein the apparatus comprises an Ethernet switch.

13. An apparatus comprising:
one or more processors; and
a memory comprising one or more instructions executable at the processors, the one or more processors being operable, when executing the instructions, to:
retrieve, based on credentials of a subscriber, a profile of the subscriber from an authentication, authorization, and accounting (AAA) server responsive to the subscriber establishing a session via a residential gateway (RG) with a Layer 2 (L2) access node of an Ethernet access network, the profile containing white-list, grey-list, and black-list multicast control parameters that identifies multicast groups that the subscriber may respectively join, request to join, and be denied to join;
communicate the white-list, grey-list, and black-list multicast control parameters to the L2 access node via a Layer 2 Control Protocol (L2CP);
wherein responsive to a request message to join a grey-listed multicast group received from the RG the one or more processors being further operable to:
determine, at a Layer 3 (L3) access node, that the subscriber is to be forwarded the grey-listed multicast group based on a correlation of the request message to a current multicast policy for the subscriber; and
instruct, only in response to the determination, the L2 access node that the grey-listed multicast group is to be forwarded to the subscriber.

14. The apparatus of claim 13 wherein, responsive to receiving from the RG a message to leave the grey-listed multicast group, the one or more processors being further operable to instruct the access node via the L2CP to remove the multicast control parameters and revert back to a default restriction configuration.

15. The apparatus of claim 14 wherein the default restriction configuration comprises a default Internet Group Management Protocol (IGMP) configuration.

16. The apparatus of claim 14 wherein the default restriction configuration comprises a default multicast access control list.

17. A method comprising:
receiving, by an access node, multicast control parameters for first, second and third lists of multicast groups, the multicast control parameters being received from a Layer 3 (L3) node following authentication of a subscriber;
applying the multicast control parameters to an multicast control protocol process running on the access node; and
wherein in response to receiving a message from a residential gateway (RG) associated with the subscriber, the message requesting joining a multicast group, the access node:
autonomously forwarding the multicast group to the subscriber where the multicast group is on the first list,
blocking the multicast group from the subscriber where the multicast group is on the second list, or else
propagating the message on a downstream path to the L3 node without forwarding the multicast group to the subscriber, where the multicast group is on the third list, the L3 node determining that the multicast group on the third list is to be forwarded to the subscriber by correlating the message to a current multicast policy for the subscriber, a forwarding entry for the multicast group on the third list only being added responsive to an instruction received from the L3 node such that the access node is allowed to forward multicast traffic to the subscriber where the multicast group is on the third list only when explicitly instructed to do so by the L3 node.

18. The method of claim 17 further comprising confirming, by the access node, application of the multicast control parameters to the L3 node.

19. The method of claim 17 wherein the L3 node comprises a broadband network gateway (BNG).

20. The method of claim 17 further comprising removing the multicast control parameters when a session of the subscriber has terminated.

* * * * *